US009634849B2

(12) United States Patent
Johnsen et al.

(10) Patent No.: US 9,634,849 B2
(45) Date of Patent: Apr. 25, 2017

(54) SYSTEM AND METHOD FOR USING A PACKET PROCESS PROXY TO SUPPORT A FLOODING MECHANISM IN A MIDDLEWARE MACHINE ENVIRONMENT

(75) Inventors: Bjørn Dag Johnsen, Oslo (NO); Martin Paul Mayhead, Hindhead (GB); Ola Tørudbakken, Oslo (NO)

(73) Assignee: ORACLE INTERNATIONAL CORPORATION, Redwood Shores ( * ) Notice: Subject to any disclaimer, the term of this patent is extended or adjusted under 35 U.S.C. 154(b) by 237 days.

(21) Appl. No.: 13/546,236

(22) Filed: Jul. 11, 2012

(65) Prior Publication Data

US 2013/0016730 A1 Jan. 17, 2013

Related U.S. Application Data

(60) Provisional application No. 61/506,557, filed on Jul. 11, 2011.

(51) Int. Cl.
*H04L 12/28* (2006.01)
*H04L 12/56* (2006.01)
(Continued)

(52) U.S. Cl.
CPC ...... *H04L 12/1863* (2013.01); *H04L 12/6402* (2013.01); *H04L 67/2814* (2013.01);
(Continued)

(58) Field of Classification Search
CPC . H04L 63/0227; H04L 63/02; H04L 12/4641; H04L 45/58; H04L 47/10;
(Continued)

(56) References Cited

U.S. PATENT DOCUMENTS 5,758,083 A 5/1998 Singh
6,012,100 A 1/2000 Frailong et al.
(Continued)

FOREIGN PATENT DOCUMENTS

CN 1514625 7/2004
CN 1520556 8/2004
(Continued)

OTHER PUBLICATIONS

International Search Report dated Sep. 23, 2013 for Application No. PCT/US2013/040639, 10 pages.
(Continued)

*Primary Examiner* — Wutchung Chu
(74) *Attorney, Agent, or Firm* — Tucker Ellis LLP

(57) ABSTRACT

A system and method can support flooding mechanism using a packet process proxy in a middleware machine environment. The middleware machine environment can comprise a gateway instance that includes an external port for receiving data packets from an external network. The middleware machine environment also comprises one or more host servers, each of which is associated with one or more virtual machines. Furthermore, said host servers can provide virtual interfaces that belong to a virtual hub associated with the gateway instance. At least one said packet is a flooded packet that is specified with an unknown destination address when it is received at the external port. The gateway instance can send the flooded packet to a designated virtual interface on a host server, and a packet process proxy on the host server can forward the flooded packet to a virtual machine on another host server for processing this packet.

18 Claims, 5 Drawing Sheets

(51) Int. Cl.
  *H04L 12/721* (2013.01)
  *H04L 12/24* (2006.01)
  *H04L 12/26* (2006.01)
  *H04L 12/18* (2006.01)
  *H04L 12/64* (2006.01)
  *H04L 29/08* (2006.01)
  *H04L 12/54* (2013.01)
  *H04L 12/933* (2013.01)

(52) U.S. Cl.
  CPC ...... *H04L 12/1836* (2013.01); *H04L 12/5696* (2013.01); *H04L 12/64* (2013.01); *H04L 49/10* (2013.01)

(58) Field of Classification Search
  CPC . H04L 49/351; H04L 49/354; H04L 41/0893; H04L 67/2814; H04L 12/1863; H04L 12/1836; H04L 12/5696; H04L 12/64; H04L 12/6402; G06F 9/5077; G06F 15/17312
  USPC ............... 370/230, 400–401, 389, 392, 428; 709/224, 225
  See application file for complete search history.

(56) References Cited

U.S. PATENT DOCUMENTS

| | | | |
|---|---|---|---|
| 6,038,233 A * | 3/2000 | Hamamoto et al. | 370/401 |
| 6,098,098 A | 8/2000 | Sandahl | |
| 6,148,336 A * | 11/2000 | Thomas et al. | 709/224 |
| 6,282,678 B1 | 8/2001 | Snay | |
| 6,286,038 B1 | 9/2001 | Reichmeyer et al. | |
| 6,308,148 B1 * | 10/2001 | Bruins et al. | 703/27 |
| 6,314,531 B1 | 11/2001 | Kram | |
| 6,343,320 B1 | 1/2002 | Fairchild | |
| 6,658,016 B1 * | 12/2003 | Dai et al. | 370/424 |
| 6,658,579 B1 | 12/2003 | Bell | |
| 6,697,360 B1 | 2/2004 | Gai | |
| 6,826,694 B1 * | 11/2004 | Dutta et al. | 726/13 |
| 6,941,350 B1 | 9/2005 | Frazier | |
| 6,981,025 B1 | 12/2005 | Frazier et al. | |
| 7,023,795 B1 | 4/2006 | Hwu | |
| 7,113,995 B1 | 9/2006 | Beukema et al. | |
| 7,290,277 B1 | 10/2007 | Chou et al. | |
| 7,398,394 B1 | 7/2008 | Johnsen | |
| 7,409,432 B1 | 8/2008 | Recio | |
| 7,577,996 B1 | 8/2009 | Merchant et al. | |
| 7,636,772 B1 | 12/2009 | Kirby | |
| 7,721,324 B1 | 5/2010 | Jackson | |
| 7,792,987 B1 * | 9/2010 | Vohra | H04L 12/4633 370/237 |
| 7,843,906 B1 | 11/2010 | Chidambaram | |
| 7,860,006 B1 | 12/2010 | Kashyap | |
| 7,894,440 B2 * | 2/2011 | Xu et al. | 370/392 |
| 8,054,832 B1 * | 11/2011 | Shukla et al. | 370/389 |
| 8,149,834 B1 * | 4/2012 | Nielsen | H04L 49/30 370/392 |
| 8,391,289 B1 | 3/2013 | Yalagandula | |
| 8,645,524 B2 | 2/2014 | Pearson | |
| 8,842,518 B2 | 9/2014 | Johnsen | |
| 2002/0016858 A1 | 2/2002 | Sawada | |
| 2002/0133620 A1 | 9/2002 | Krause | |
| 2003/0005039 A1 | 1/2003 | Craddock | |
| 2003/0051026 A1 | 3/2003 | Carter et al. | |
| 2003/0105914 A1 | 6/2003 | Dearth et al. | |
| 2004/0013088 A1 | 1/2004 | Gregg | |
| 2004/0028047 A1 | 2/2004 | Hou | |
| 2004/0037279 A1 * | 2/2004 | Zelig et al. | 370/390 |
| 2004/0078709 A1 | 4/2004 | Beukema | |
| 2004/0103282 A1 | 5/2004 | Meier et al. | |
| 2004/0123142 A1 | 6/2004 | Dubal et al. | |
| 2004/0168089 A1 | 8/2004 | Lee | |
| 2004/0199764 A1 | 10/2004 | Koechling | |
| 2005/0071709 A1 | 3/2005 | Rosenstock | |
| 2005/0100033 A1 * | 5/2005 | Arndt et al. | 370/412 |
| 2005/0108434 A1 | 5/2005 | Witchey | |
| 2005/0163115 A1 * | 7/2005 | Dontu | H04L 12/46 370/389 |
| 2005/0198371 A1 * | 9/2005 | Smith | H04L 45/02 709/238 |
| 2006/0100033 A1 | 5/2006 | Nelson | |
| 2006/0215673 A1 | 9/2006 | Olvera-Hernandez | |
| 2006/0230219 A1 | 10/2006 | Njoku | |
| 2007/0022479 A1 | 1/2007 | Sikdar et al. | |
| 2007/0036178 A1 * | 2/2007 | Hares et al. | 370/490 |
| 2007/0038703 A1 | 2/2007 | Tendjoukian | |
| 2007/0073882 A1 | 3/2007 | Brown | |
| 2007/0140266 A1 | 6/2007 | Njoku | |
| 2007/0162520 A1 | 7/2007 | Petersen et al. | |
| 2007/0180497 A1 | 8/2007 | Popescu et al. | |
| 2007/0198656 A1 | 8/2007 | Mazzaferri et al. | |
| 2007/0280104 A1 | 12/2007 | Miyoshi | |
| 2007/0294405 A1 | 12/2007 | Mohindra et al. | |
| 2008/0049764 A1 * | 2/2008 | Solomon | H04L 12/66 370/401 |
| 2008/0137528 A1 | 6/2008 | O'Toole | |
| 2008/0159277 A1 | 7/2008 | Vobbilisetty | |
| 2008/0267183 A1 | 10/2008 | Arndt | |
| 2008/0301256 A1 | 12/2008 | McWilliams | |
| 2009/0003317 A1 | 1/2009 | Kasralikar | |
| 2009/0019505 A1 | 1/2009 | Gopalakrishnan | |
| 2009/0070448 A1 | 3/2009 | Pearson | |
| 2009/0073895 A1 | 3/2009 | Morgan | |
| 2009/0080328 A1 | 3/2009 | Hu | |
| 2009/0216910 A1 | 8/2009 | Duchesneau | |
| 2009/0222558 A1 | 9/2009 | Xu et al. | |
| 2009/0234974 A1 | 9/2009 | Arndt | |
| 2009/0262741 A1 * | 10/2009 | Jungck et al. | 370/392 |
| 2010/0008291 A1 | 1/2010 | LeBlanc | |
| 2010/0054129 A1 | 3/2010 | Kuik | |
| 2010/0103837 A1 * | 4/2010 | Jungck et al. | 370/252 |
| 2010/0107162 A1 * | 4/2010 | Edwards | G06F 9/5077 718/1 |
| 2010/0118868 A1 | 5/2010 | Dabagh | |
| 2010/0138532 A1 | 6/2010 | Glaeser | |
| 2010/0146093 A1 | 6/2010 | Kuik | |
| 2010/0228961 A1 | 9/2010 | Burns et al. | |
| 2010/0257269 A1 | 10/2010 | Clark | |
| 2010/0275199 A1 | 10/2010 | Smith et al. | |
| 2010/0287548 A1 | 11/2010 | Zhou et al. | |
| 2010/0306408 A1 | 12/2010 | Greenberg | |
| 2010/0325257 A1 * | 12/2010 | Goel et al. | 709/223 |
| 2011/0023108 A1 | 1/2011 | Geldermann et al. | |
| 2011/0131447 A1 | 6/2011 | Prakash et al. | |
| 2011/0239268 A1 | 9/2011 | Sharp | |
| 2011/0246669 A1 | 10/2011 | Kanada et al. | |
| 2011/0268117 A1 | 11/2011 | Davis | |
| 2011/0299537 A1 * | 12/2011 | Saraiya | H04L 61/2596 370/392 |
| 2011/0317703 A1 * | 12/2011 | Dunbar et al. | 370/392 |
| 2012/0103837 A1 | 5/2012 | Wall | |
| 2012/0131225 A1 | 5/2012 | Chiueh et al. | |
| 2012/0147894 A1 | 6/2012 | Mulligan | |
| 2012/0173757 A1 | 7/2012 | Sanden | |
| 2012/0265976 A1 | 10/2012 | Spiers | |
| 2012/0278804 A1 | 11/2012 | Narayanasamy | |
| 2012/0291028 A1 | 11/2012 | Kidambi et al. | |
| 2012/0307826 A1 | 12/2012 | Matsuoka | |
| 2012/0314706 A1 | 12/2012 | Liss | |
| 2012/0320929 A9 * | 12/2012 | Subramanian et al. | 370/419 |
| 2012/0331127 A1 | 12/2012 | Wang | |
| 2012/0331142 A1 | 12/2012 | Mittal et al. | |
| 2013/0016718 A1 * | 1/2013 | Johnsen et al. | 370/390 |
| 2013/0036136 A1 | 2/2013 | Horii | |
| 2013/0077492 A1 | 3/2013 | Scaglione | |
| 2013/0232492 A1 | 9/2013 | Wang | |

(56) References Cited

U.S. PATENT DOCUMENTS

2014/0115584 A1 4/2014 Mudigonda
2014/0223431 A1 8/2014 Yoshimura

FOREIGN PATENT DOCUMENTS

| CN | 1536842 | 10/2004 |
|---|---|---|
| CN | 1617526 | 5/2005 |
| CN | 101123498 A | 2/2008 |
| EP | 1 128 607 A2 | 8/2001 |
| EP | 2160068 A1 | 3/2010 |
| WO | 2012037518 | 3/2012 |

OTHER PUBLICATIONS

Lee, M. et al., "Security Enhancement in Infiniband Architecture," Proceedings of the 19th IEEE International Parallel and Distributed Processing Symposium, Denver, Colorado, Apr. 4-8, 2005, Piscataway, New Jersey, Apr. 4, 2005, 18 pages.

Sun Infiniband Dual Port 4x QDR PCIe ExpressModule and Low Profile Host Channel Adapters M2, Frequently Asked Questions, Sep. 21, 2010, http://www.oracle.com/us/products/servers-storage/networking/infiniband/sun-qdr-ib-hcas-faq-172841.pdf, retrieved on Sep. 11, 2012, 4 pages.

International Searching Authority at the European Patent Office, International Search Report and Written Opinion for PCT International Application No. PCT/US2012/046225, Oct. 11, 2012, 10 pages.

International Searching Authority at the European Patent Office, International Search Report and Written Opinion for PCT International Application No. PCT/US2012/046219, Mar. 1, 2013, 10 pages.

International Search Report dated Sep. 26, 2013 for Application No. PCT/US2013/040656, 10 pages.

State Intellectual Property Office of the People's Republic of China, Search Report for Chinese Patent Application No. 201280030334.2, Office Action dated Aug. 21, 2015, 2 pages.

State Intellectual Property Office of the People's Republic of China, Search Report for Chinese Patent Application No. 201280027279.1, Office Action dated Sep. 9, 2015, 2 pages.

Notice of Allowance issued by United States Patent and Trademark Office on U.S. Appl. No. 13/892,162 mailed May 19, 2016 (9 pages).

State Intellectual Property Office of the People's Republic of China, Search Report for Chinese Patent Application No. 201380014177.0, Office Action dated Jun. 1, 2016, 2 pages.

Office Action issued by United States Patent and Trademark Office for U.S. Appl. No. 13/892,133, mailed Aug. 22, 2016 (16 pages).

Notice of Allowance issued by United States Patent and Trademark Office for U.S. Appl. No. 13/892,174, mailed Oct. 5, 2016 (9 pages).

State Intellectual PropertyOffice of the People's Republic of China, Search Report for Chinese Patent Application No. 201380014173.2, Office Action Dated Oct. 19, 2016, 11 pages.

* cited by examiner

SYSTEM AND METHOD FOR USING A PACKET PROCESS PROXY TO SUPPORT A FLOODING MECHANISM IN A MIDDLEWARE MACHINE ENVIRONMENT

CLAIM OF PRIORITY

This application claims priority to U.S. Provisional Patent Application No. 61/506,557, entitled "SYSTEM AND METHOD FOR USING UNICAST AND MULTICAST FLOODING MECHANISMS TO PROVIDE EoIB GATEWAY vNICs" filed Jul. 11, 2011, which application is herein incorporated by reference.

CROSS REFERENCE TO RELATED APPLICATIONS

The application is related to the following patent applications, which are hereby incorporated by reference in its entirety:

U.S. patent application Ser. No. 13/546,217, entitled "SYSTEM AND METHOD FOR USING A MULTICAST GROUP TO SUPPORT A FLOODING MECHANISM IN A MIDDLEWARE MACHINE ENVIRONMENT", filed Jul. 11, 2012, which is now U.S. Pat. No. 9,054,886, issued on Jun. 9, 2015;

U.S. patent application Ser. No. 13/546,261, entitled "SYSTEM AND METHOD FOR SUPPORTING A SCALABLE FLOODING MECHANISM IN A MIDDLEWARE MACHINE ENVIRONMENT", filed Jul. 11, 2012;

U.S. patent application Ser. No. 13/546,368, entitled "SYSTEM AND METHOD FOR SUPPORTING DIRECT PACKET FORWARDING IN A MIDDLEWARE MACHINE ENVIRONMENT", filed Jul. 11, 2012; and U.S. patent application Ser. No. 13/546,405, entitled "SYSTEM AND METHOD FOR SUPPORTING VIRTUAL MACHINE MIGRATION IN A MIDDLEWARE MACHINE ENVIRONMENT", filed Jul. 11, 2015, which is now U.S. Pat. No. 8,874,742, issued on Oct. 28, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a middleware machine environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein are systems and methods for using a packet process proxy to support a flooding mechanism in a middleware machine environment. The middleware machine environment can comprise a gateway instance that includes an external port for receiving data packets from an external network. The middleware machine environment also comprises one or more host servers, each of which is associated with one or more virtual machines. Furthermore, said host servers can provide virtual interfaces that belong to a virtual hub associated with the gateway instance. At least one said packet is a flooded packet that is specified with an unknown destination address when it is received at the external port. The gateway instance can send the flooded packet to a designated virtual interface on a host server, and a packet process proxy on the host server can forward the flooded packet to a virtual machine on another host server for processing this packet.

DETAILED DESCRIPTION

Described herein is a system and method for providing a middleware machine or similar platform. In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or WebLogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

Middleware Machine Environment

Figure 1:
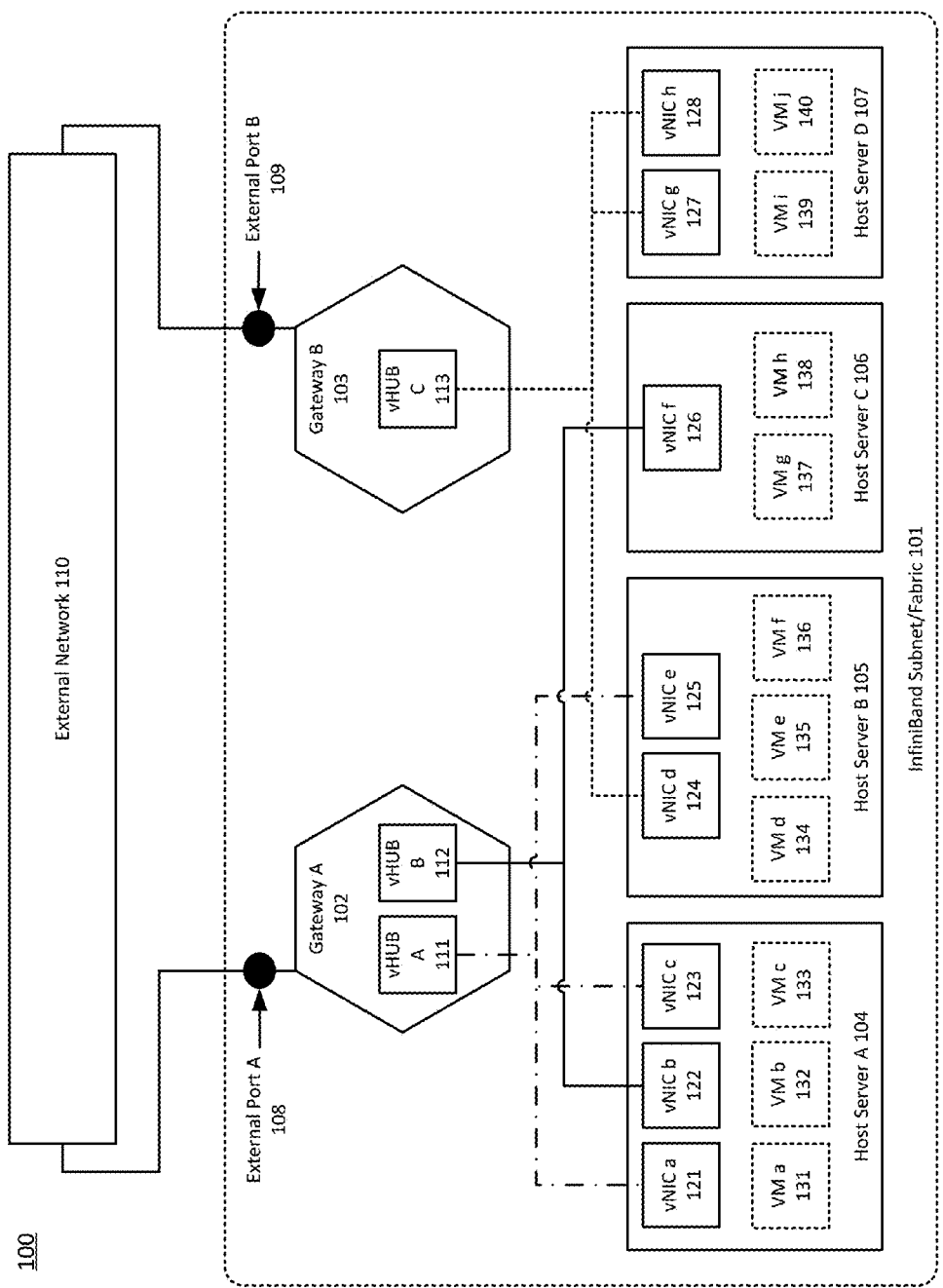
FIG. 1 shows an illustration of a middleware machine environment, in accordance with an embodiment of the invention.

FIG. 1 shows an illustration of a middleware machine environment, in accordance with an embodiment of the invention. As shown in FIG. 1, a middleware machine environment 100 can include an IB fabric 101 that connects to an external network 110 using one or more gateway instances 102-103. The IB fabric also includes a plurality of host servers 104-107 (each of which can be hardware itself or software running on top of a physical host server), which contains a plurality of virtual machines (VMs) 131-140. Each gateway instance A-B 102-103 can be associated with an external port 108-109 that can receive data packets from the external network 110. As shown in FIG. 1, external port A 108 is associated with gateway instance A 102, and external port B 109 is associated with gateway instance B 103.

Additionally, the host servers provides a plurality of virtual interfaces, such as virtual network interface cards (vNICs) 121-128, for receiving data packets from the external network via the gateway instances A-B 102-103. The gateway instances 102-103 can define and maintain one or more virtual hubs (vHUBs) 111-113, each of which defines a logical layer 2 (L2) link on the IB fabric side that contains vNICs associated with the same gateway instance. Furthermore, the vNICs and the hosts that belong to the same vHUB can communicate with each other without involving the associated gateway instance.

As shown in FIG. 1, vHUB A 111 on gateway A is associated with vNIC a 121 and vNIC c 123 on host server A, and vNIC e 125 on host server B. Also, vHUB B 112 on gateway A is associated with vNIC b 122 on host server A and vNIC f 126 on host server C; and vHUB C 113 on gateway B is associate with vNIC d 124 on host server B, and vNIC g 127 and vNIC h 128 on host server D.

Figure 2:
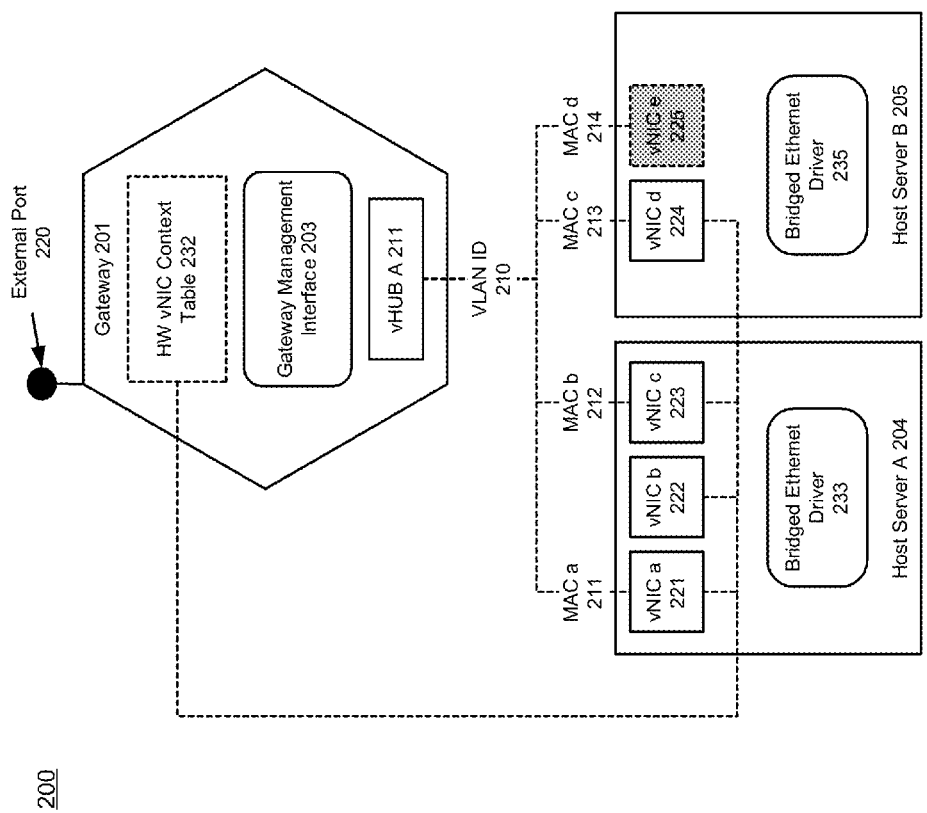
FIG. 2 shows an illustration of a virtual hub (vHUB) that includes various vNICs, in accordance with an embodiment of the invention.

FIG. 2 shows an illustration of a virtual hub (vHUB) that includes various vNICs, in accordance with an embodiment of the invention. As shown in FIG. 2, a middleware machine environment 200 includes a gateway instance 201 and several host servers 204-205 or hypervisors. The gateway instance 201, which comprises an external port 220, can maintain a virtual hub (vHUB), vHUB A 211. The vHUB A 211 can be assigned with a unique virtual LAN ID (VLAN ID) 210. Additionally, the vHUB A 211 can include various vNICs 221, 223-225, each of which is assigned with a Media Access Control (MAC) address 211-214. Each logical vNIC 221, 223-225 can be represented by a MAC/VLAN ID combination associated with a specific Host Channel Adaptor (HCA) port.

A vNIC in the IB fabric can be uniquely identified using a virtual Ethernet interface (VIF), which includes a combination of a VLAN ID and a MAC address. Also, when the VIFs are used concurrently in the same vHub in a gateway instance, different MAC addresses are used for the different VI Fs. Additionally, the system can perform an address translation from an Ethernet layer 2 MAC address to an IB layer 2 address that uses local identifier (LID)/global identifier (GID) and queue pair number (QPN).

Furthermore, the gateway instance 201 can include a hardware vNIC context table 232, which contains various entries or hardware vNIC contexts. The hardware vNIC context table 232 can be stored in a memory of the gateway instance 201. When a host driver is sending packets to the external Ethernet via the IB fabric and the gateway 201, this hardware vNIC context table 232 can be used to verify that the correct source address information is used by the correct host. The hardware context table 232 can also be used to look up the correct host HCA port address on the IB fabric and QPN within that HCA, when packets are received by the gateway from the external Ethernet. Additionally, the hardware vNIC contexts can be used to directly steer packets for a specific logical vNIC to a dedicated receive queue in the designated host context/memory.

The gateway instance 201, which can be hardware itself or a software running on top of a hardware switch, allows the use of network managed vNIC allocation. The management interface 203 on the gateway instance 201, e.g. a NM2-GW service processor, can be used to allocate hardware vNIC contexts on behalf of specific host (HCA) ports.

A single vNIC in the IB fabric may or may not be allocated with a hardware vNIC context recorded in the hardware vNIC context table 232. In the example as shown in FIG. 2, vNIC a 221, vNIC b 222, and vNIC c 223 on host server A 204, and vNIC d 224 on host server B 205, can be provided with a hardware vNIC context (i.e. the gateway instance 201 can obtain the correct host HCA port address on the IB fabric and QPN within that HCA for an incoming data packet). Additionally, vNIC e 225 on host server B 205 is not allocated with hardware vNIC context 232 and can only be used in a bridged Ethernet context. In one example, if the complete gateway hardware vNIC contexts in the hardware vNIC context table 232 are consumed by the network managed vNICs, e.g. vNICs a-d 221-224, then all bridge based vNICs, e.g. vNIC e 225, can be flooding based (i.e. not having any dedicated HW vNIC context).

A flooding mechanism can be used to scale the number of logical vNICs beyond the size of the gateway HW vNIC context table. Using the flood-based vNICs, the system allows the same amount of receive queues on the host(s) to receive packets for a large number of logical vNICs. Furthermore, using a flooding mechanism, the system allows schemes where hardware vNIC contexts can be established in the hardware context table 232 after initial packet traffic from the external Ethernet has been received.

Using a Packet Process Proxy to Support a Flooding Mechanism

In accordance with one embodiment of the present invention, when a data packet with an unknown destination is posted on a network switch in a middleware machine environment, a packet process proxy can be used to support a flooding mechanism in order to assure that the data packet can be properly handled.

Figure 3:
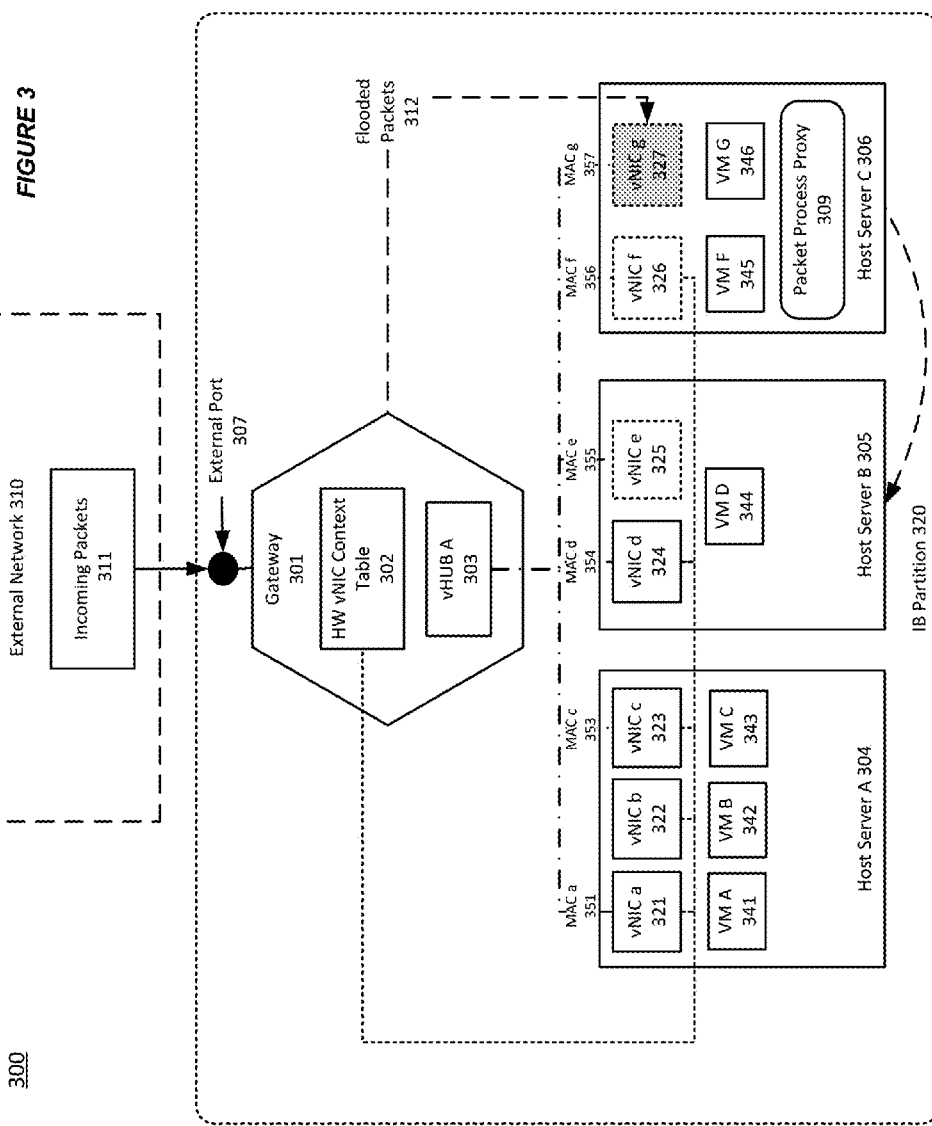
FIG. 3 shows an illustration of using a packet process proxy to support a flooding mechanism in a middleware machine environment, in accordance with an embodiment of the invention.

FIG. 3 shows an illustration of using a packet process proxy to support a flooding mechanism in a middleware machine environment, in accordance with an embodiment of the invention. As shown in FIG. 3, a middleware machine environment 300 can comprise a gateway instance 301 that connects to an external network 310.

The gateway instance 301 can include an external port 307 that is adapted to receive one or more incoming data packets 311 from the external network 310. Additionally, the middleware machine environment 300 also comprises one or more host servers A-C 304-306, each of which can be associated with one or more virtual machines (VMs) 341-346 that operate to process the data packets received from the external network. The host servers 304-306 can provide a plurality of virtual interfaces 321-327, among which the virtual interfaces a 321 and c-g 323-327 belong to a virtual hub 303 in the gateway instance. Each of the virtual interfaces a 321 and c-g 323-327 in the virtual hub 303 can be associated with a different MAC address, e.g. MAC a 351 and c-g 353-357 respectively.

The gateway instance 301 can determine whether an incoming packet received at the external port specifies a virtual interface that is associated with a context in the hardware context table 302. If the virtual interface specified in the incoming packet is not associated with any context in the hardware context table 302, then the gateway instance 301 can consider that the incoming packet received at the external port 307 has an unknown destination address, in which case the gateway instance 301 can treat this data packet as a flooded packet 312 and relying on a flooding mechanism to properly handled the flooded packet 312.

In accordance with an embodiment of the invention, a packet process proxy 309 can be used to support the flooding mechanism. The packet process proxy 309 can reside on a host server, e.g. host server C 306, that provides a single designated flood destination per external port. As show in FIG. 3, vNIC g 327 on host server C 306 is dedicated for handling data packets received at the external port 307 with an unknown destination within the virtual hub A 303. Here, the gateway instance 301 can send the flooded packet 312 to vNIC g 327 via either a unicast or a single-member multicast.

The flooding mechanism based on the packet process proxy 309 can be used in an IB partition 320 with various numbers of virtual machines (VMs) and various numbers of virtual interfaces. For example, the packet process proxy 309 can forward the flooded packet 312 only to a virtual interface that represents a flood based vNIC 326 on host server 306 that is associated with a target VM F 346, or a flood based vN IC 325 on a different host server B 305 that is associated with a target VM D 344. Here, the target VM D 344 can be associated with another virtual interface, vNIC d 324, which is associated with a context in the hardware context table 302. Thus, using the packet process proxy 309, the gateway instance 301 can avoid incorrect packet replication that may confuse the standard network stacks on different host servers 304-306.

In accordance with an embodiment of the invention, the the packet process proxy 309, an IB fabric specific proxy function, can be used to perform intermediate processing of incoming packets 311, e.g. implementing fire-wall, load-balancing or other intermediate functions. The packet process proxy 309 can be adapted to handle exactly the packets it receives, and hence, improve the efficiency of the HCA links. When a dedicated flood address per external port is used, the efficiency of the HCA links can be 100%. Additionally, by implementing proxy function using dedicated hardware (i.e. HCA ports and processing capacity) in the fabric, there is no dependency on trusting any particular set of hypervisors relative to sharing of the network switch instance, and there is by definition no bandwidth/capacity conflict with other I/O or processing tasks.

Figure 4:
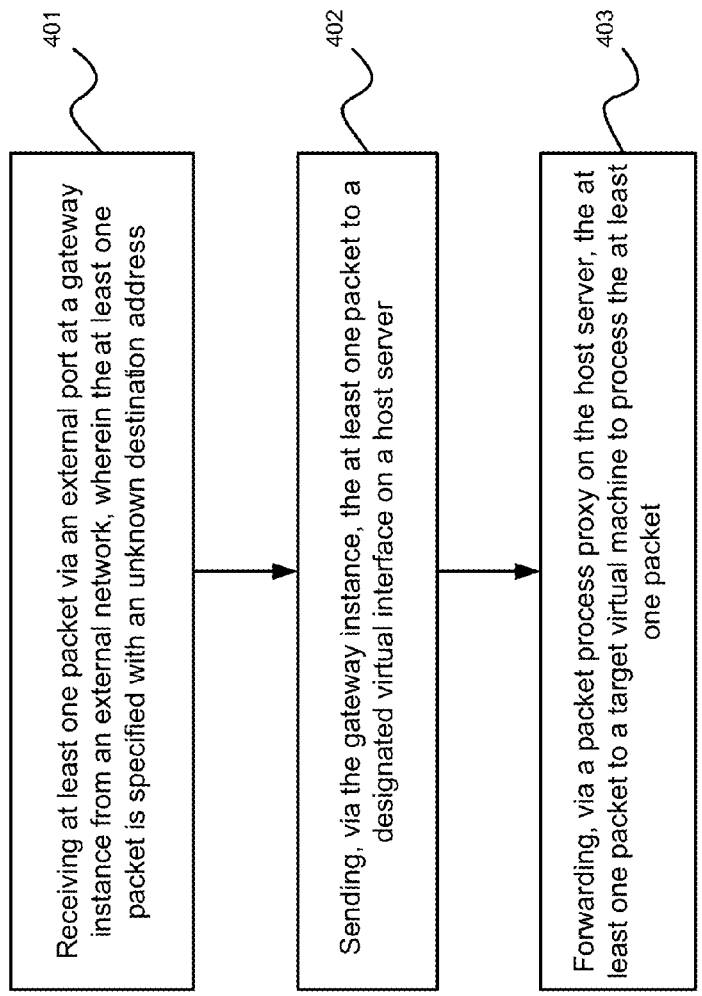
FIG. 4 illustrates an exemplary flow chart for using a packet process proxy to support a flooding mechanism in a middleware machine environment, in accordance with an embodiment of the invention.

FIG. 4 illustrates an exemplary flow chart for using a packet process proxy to support a flooding mechanism in a middleware machine environment, in accordance with an embodiment of the invention. As shown in FIG. 4, at step 401, an external port at a gateway instance receives at least one packet from an external network, wherein the at least one packet is specified with an unknown destination address. Then, at step 402, the gateway instance can send the at least one packet to a designated virtual interface on a host server. Additionally, at step 403, a packet process proxy on the host server can forward the at least one packet to a virtual machine on the same or another host server for processing the at least one packet.

Allocating Different Types of vNICs

Figure 5:
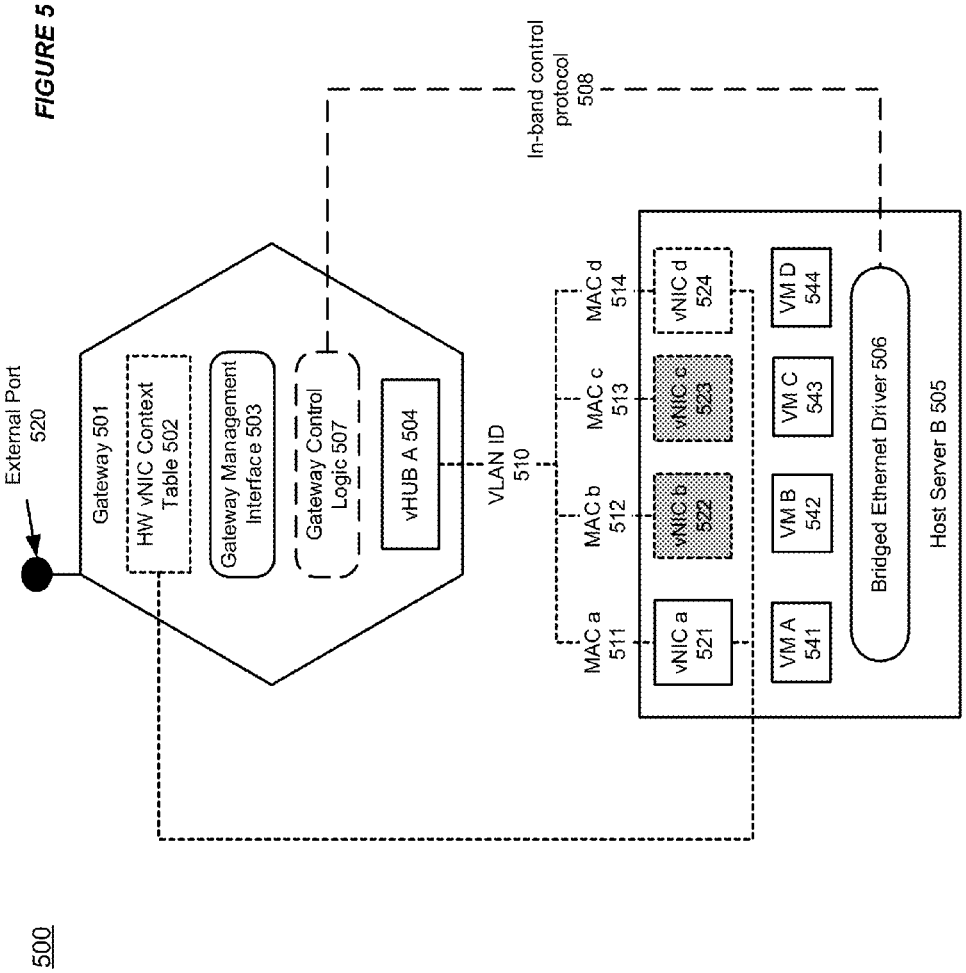
FIG. 5 shows an illustration of allocating different types of vNICs in a middleware machine environment, in accordance with an embodiment of the invention.

FIG. 5 shows an illustration of allocating different types of vNICs in a middleware machine environment, in accordance with an embodiment of the invention. As shown in FIG. 5, a middleware machine environment 500 includes a gateway instance 501 and various host servers and/or hypervisors, e.g. a host server B 505 with VMs A-D 541-544. The gateway instance 501, which comprises an external port 520, can maintain a virtual hub, vHUB A 504. The vHUB A 504 can be assigned with a unique virtual LAN ID (VLAN ID) 510. Additionally, the vHUB A 504 can include various vNICs, e.g. vNIC a-d 521-524, each of which is assigned with a MAC address, e.g. a-d 511-514.

In order to optimize performance and reduce flooding overhead for dealing with shared queues, a parent vNIC, e.g. vNIC a 521, can be allocated via a gateway management interface 503. Additionally, multiple child vNICs, e.g. vNICs b-d 522-524, can be created by a designated host driver, e.g. a bridged Ethernet driver 506 on the host server 505, via the in-band control protocol 508 between the host driver 506 and the gateway control logic 507.

The parent vNIC a 521, which is based on hardware context in the hardware vNIC context table 502, can be allocated by using attributes/metadata specified via the gateway management interface 503. The information for creating the parent vNIC a 521 can be stored as metadata within the gateway control logic 507. Additionally, the metadata for the parent vNIC a 521 can define different policies that impose restrictions on VLAN and MAC address ranges, which can be used by the child vNICs b-d 522-524.

The bridged Ethernet driver 506 can allocate the child vNICs, e.g. vNIC d 524, with dedicated hardware vNIC context in the hardware vNIC context table 502 for specific VIFs (MAC/VLAN), e.g. MAC d 514. Such decisions can be made based on explicitly controlled caching policies, e.g. a per VM SLA policy. Furthermore, when a flooding mechanism is used, the hardware context for a single parent vNIC a 521 can be used by the child vNICs b-c 522-523 to send packets without source address verification. All sharing physical hosts/hypervisors can trust each other, and the external Ethernet network can have the required VLAN.

Furthermore, the gateway instance 501 can handle the connectivity of different types vNICs, e.g. hardware context based vNICs a 521 and d 524 and flooding based vNICs b-c 522-523, in a way similar to handling conventional physical NICs. In one example, the gateway instance 501 can handle an extreme use case that includes a combination of a large number of para-virtualized and/or time shared VMs per physical server and also a large number of VLANs per VM. Furthermore, the granularity of multi-tenant provisioning of the system can be set up so that only a single tenant can use a single flood address hardware resource in the gateway instance.

In accordance with an embodiment of the invention, at least one virtual interface, e.g. vNIC a 521 on a gateway instance 501, is a parent virtual interface that is associated with one or more child virtual interfaces, e.g. vNICs b-d 522-524. The parent vNIC a 521 can be configured with different policy information that limits the set of MAC address and VLAN IDs that the related child vNICs b-d 522-524 can be associated with. Additionally, the parent vNIC a 521 can be provided with a context in a hardware context table 502, and at least one child virtual interfaces, e.g. vNICs b-c 522-523, may not be associated with any context in the hardware context table.

In general, the invention relates to a system for supporting flooding mechanism in a middleware machine environment operable on one or more microprocessors, comprising:
 means for receiving at least one packet via an external port at a gateway instance from an external network, wherein the at least one packet is specified with an unknown destination address;
 means for sending, via the gateway instance, the at least one packet to a designated virtual interface on a host server; and
 means for forwarding, via a packet process proxy on the host server, the at least one packet to a target virtual machine to process the at least one packet.

Said system further comprises means for providing a hardware context table that contains a plurality of contexts that can be associated with one or more said virtual interfaces.

Said system further comprises means for determining, via the gateway instance, whether an incoming packet received at the external port specifies a virtual interface that is associated with a context in the hardware context table.

Said system further comprises means for considering an incoming packet received at the external port to have an unknown destination address when the incoming packet is destined for a virtual interface that is not associated with any context in the hardware context table.

Said system further comprises means for using the packet process proxy with no incorrect packet replication in a network partition with various numbers of virtual machines (VMs) and various numbers of virtual interfaces.

Said system further comprises means for allowing the target virtual machine to reside on the host server.

Said system further comprises means for allowing the target virtual machine to reside on another host server.

Said system further comprises means for sending, via the gateway instance, the at least one packet to the designated virtual interface via unicast or a single-member multicast.

Said system further comprises means for allowing at least one virtual interface to be a parent virtual interface that is associated with one or more child virtual interfaces, and wherein the parent virtual interface is associated with a context in a hardware context table, and each of the one or more child virtual interfaces is not associated with any context in the hardware context table.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting flooding mechanism in a middleware machine environment including one or more host servers operable on one or more microprocessors, comprising:
 a gateway instance, wherein the gateway instance is associated with an external port that is adapted to receive one or more data packets from an external network into the middleware environment;
 a plurality of virtual interfaces on the one or more host servers, wherein each of said one or more host servers is associated with one or more virtual machines that operate to process the one or more data packets; and
 a packet process proxy residing on a host server from the one or more host servers,
 wherein when at least one packet of the one or more data packets is specified with an unknown destination address when it is received at the external port of the gateway instance,
 the gateway instance operates to send the at least one packet to a designated virtual interface on the host server that is dedicated to handling data packets specified with unknown destination addresses and that is associated with the packet process proxy via a unicast or a single-member multicast, and
 the packet process proxy operates to forward the at least one packet directly from the packet process proxy to a virtual interface associated with a target virtual machine from the one or more host servers to process the at least one packet.

2. The system according to claim 1, further comprising:
 a hardware context table that contains a plurality of contexts that can be associated with one or more said virtual interfaces.

3. The system according to claim 2, wherein:
the gateway instance operates to determine whether an incoming packet received at the external port specifies a virtual interface that is associated with a context in the hardware context table.

4. The system according to claim 3, wherein:
an incoming packet received at the external port is considered to have an unknown destination address when the incoming packet is destined for a virtual interface that is not associated with any context in the hardware context table.

5. The system according to claim 1, wherein:
the packet process proxy is used with no incorrect packet replication in a network partition with various numbers of virtual machines (VMs) and various numbers of virtual interfaces.

6. The system according to claim 1, wherein:
the target virtual machine resides on the host server.

7. The system according to claim 1, wherein:
the target virtual machine resides on another host server.

8. The system according to claim 1, wherein:
at least one virtual interface is a parent virtual interface that is associated with one or more child virtual interfaces, wherein policy information associated with the parent virtual interface on the gateway limits addresses and/or identifications that the one or more child virtual interfaces can be associated with.

9. The system according to claim 8, wherein:
the parent virtual interface is associated with a context in a hardware context table, and at least one child virtual interfaces is not associated with any context in the hardware context table.

10. A method for supporting flooding mechanism in a middleware machine environment including one or more host servers operable on one or more microprocessors, comprising:
providing a gateway instance, wherein the gateway instance is associated with an external port that is adapted to receive one or more data packets from an external network into the middleware environment;
providing said one or more host servers, wherein each of said one or more host servers is associated with one or more virtual machines that operate to process the one or more data packets; and
providing a packet process proxy residing on a host server from the one or more host servers;
receiving at least one packet via the external port at the gateway instance from the external network, wherein the at least one packet is specified with an unknown destination address;
sending, via the gateway instance, the at least one packet to a designated virtual interface on the host server that is dedicated to handling data packets specified with unknown destination addresses and that is associated with the packet process proxy via a unicast or a single-member multicast; and
forwarding, via the packet process proxy on the host server, the at least one packet directly from the packet process proxy to a virtual interface associated with a target virtual machine from the one or more host servers to process the at least one packet.

11. The method according to claim 10, further comprising:
providing a hardware context table that contains a plurality of contexts that can be associated with one or more said virtual interfaces.

12. The method according to claim 11, further comprising:
determining, via the gateway instance, whether an incoming packet received at the external port specifies a virtual interface that is associated with a context in the hardware context table.

13. The method according to claim 12, further comprising:
considering an incoming packet received at the external port to have an unknown destination address when the incoming packet is destined for a virtual interface that is not associated with any context in the hardware context table.

14. The method according to claim 10, further comprising:
using the packet process proxy with no incorrect packet replication in a network partition with various numbers of virtual machines (VMs) and various numbers of virtual interfaces.

15. The method according to claim 10, further comprising:
allowing the target virtual machine to reside on the host server.

16. The method according to claim 10, further comprising:
allowing the target virtual machine to reside on another host server.

17. The method according to claim 10, further comprising:
allowing at least one virtual interface to be a parent virtual interface that is associated with one or more child virtual interfaces, wherein policy information associated with the parent virtual interface on the gateway instances limits addresses and/or identifications that the one or more child virtual interfaces can be associated with, and wherein the parent virtual interface is associated with a context in a hardware context table, and at least one child virtual interfaces is not associated with any context in the hardware context table.

18. A non-transitory machine readable storage medium having instructions stored thereon for supporting flooding mechanism in a middleware machine environment including one or more host servers that when executed cause a system to perform the steps of:
using a gateway instance, wherein the gateway instance is associated with an external port that is adapted to receive one or more data packets from an external network into the middleware environment;
using the one or more host servers, wherein each of said one or more host servers is associated with one or more virtual machines that operate to process the one or more data packets; and
using a packet process proxy residing on a host server from the one or more host servers;
receiving at least one packet via the external port at the gateway instance from the external network, wherein the at least one packet is specified with an unknown destination address;
sending, via the gateway instance, the at least one packet to a designated virtual interface on the host server that is dedicated to handling data packets specified with unknown destination addresses and that is associated with the packet process proxy via a unicast or single-member multicast; and
forwarding, via the packet process proxy on the host server, the at least one packet directly from the packet process proxy to a virtual interface associated with a target virtual machine from the one or more host servers to process the at least one packet.

* * * * *

UNITED STATES PATENT AND TRADEMARK OFFICE
CERTIFICATE OF CORRECTION

PATENT NO. : 9,634,849 B2  
APPLICATION NO. : 13/546236  
DATED : April 25, 2017  
INVENTOR(S) : Johnsen et al.

Page 1 of 1

It is certified that error appears in the above-identified patent and that said Letters Patent is hereby corrected as shown below:

In the Specification

Column 4, Line 14, delete "VI Fs." and insert -- VIFs. --, therefor.

Column 5, Line 54, delete "vN IC" and insert -- vNIC --, therefor.

Column 5, Lines 62-63, delete "the the" and insert -- the --, therefor.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*